United States Patent
Wilson et al.

(10) Patent No.: US 6,745,294 B1
(45) Date of Patent: Jun. 1, 2004

(54) MULTI-PROCESSOR COMPUTER SYSTEM WITH LOCK DRIVEN CACHE-FLUSHING SYSTEM

(75) Inventors: Kenneth Mark Wilson, San Jose, CA (US); Fong Pong, Mountain View, CA (US); Lance Russell, Hollister, CA (US); Tung Nguyen, Cupertino, CA (US); Lu Xu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 314 days.

(21) Appl. No.: 09/877,539

(22) Filed: Jun. 8, 2001

(51) Int. Cl.⁷ .............................................. G06F 12/00
(52) U.S. Cl. ................. 711/135; 711/133; 711/147; 711/136; 711/142; 711/141; 710/200
(58) Field of Search .................... 711/135, 133, 711/136, 141, 142, 147; 710/200

(56) References Cited

U.S. PATENT DOCUMENTS 4,958,273 A * 9/1990 Anderson et al. .............. 712/29
5,669,002 A * 9/1997 Buch ........................... 710/200
5,724,549 A * 3/1998 Selgas et al. ................. 711/141
5,745,730 A * 4/1998 Nozue et al. ................. 711/135

OTHER PUBLICATIONS

U.S. patent application Ser. No. 09/877,368, Wilson et al., filed Jun. 8, 2001.
U.S. patent application Ser. No. 09/258,549, Pong, filed Feb. 28, 1999.

* cited by examiner

*Primary Examiner*—Matthew Kim
*Assistant Examiner*—Zhuo H. Li

(57) ABSTRACT

A method is provided for cache flushing in a computer system having a processor, a cache, a synchronization primitive detector, and a cache flush engine. The method includes providing a synchronization primitive from the processor into the computer system; detecting the synchronization primitive in the synchronization primitive detector; providing a trigger signal from the synchronization primitive detector in response to detection of the synchronization primitive; providing cache information from the recall unit into the computer system in response to the trigger signal; and flushing the cache in response to the cache information in the computer system.

15 Claims, 4 Drawing Sheets

MULTI-PROCESSOR COMPUTER SYSTEM WITH LOCK DRIVEN CACHE-FLUSHING SYSTEM

CROSS-REFERENCE TO RELATED APPLICATIONS

The present application contains subject matter related to U.S. patent application Ser. No. 09/258,549 entitled "CACHE-FLUSHING ENGINE FOR DISTRIBUTED SHARED MEMORY MULTI-PROCESSOR COMPUTER SYSTEMS" by Fong Pong, which is hereby incorporated by reference.

The present application also contains subject matter related to concurrently filed U.S. patent application Ser. No. 09/877,368 entitled "Multi-Processor Computer System With Cache-flushing System Using Memory Recall" by Kenneth Mark Wilson, Fong Pong, Lance Russell, Tung Nguyen, and Lu Xu, which is hereby incorporated by reference.

TECHNICAL FIELD

The present invention relates generally to multi-processor computer systems and more particularly to cache-coherent systems.

BACKGROUND ART

High performance, multi-processor computer systems with a large number of microprocessors are built by interconnecting a number of node structures, each node containing a subset of the processors and memory in the system. While the memory in the system is distributed, several of these systems support a shared memory abstraction where all the memory in the system appears as a large memory common to all processors in the system. To support high-performance, these systems typically allow processors to maintain copies of portions of memory data in their local caches where the data is most quickly available. However, for safety, it is desirable, after caching new data, to send the new data down to the memory in the system because it is a safer environment with a large range of tools for recovering any lost data.

Since multiple processors can cache the same data, these systems must incorporate a cache coherence mechanism to keep the copies coherent, or up-to-date.

In some cache-coherent systems, each memory block (typically a portion of memory tens of bytes in size) is assigned a "home node", which maintains all necessary global information for that memory block, manages the sharing of that memory block, and guarantees its coherence. The home node maintains a directory, which identifies the nodes that possess a copy of the memory block. When a node processor requires a copy of the memory block, it requests the memory block from its local cache. If the data is found, the memory access is to the local cache. Alternatively, if the data is not found, a remote memory access may be performed to the home node. The home node supplies the data from memory if its memory has the latest data. If another node has the latest copy of the data, the home node directs this node to forward the data to the requesting node. The data is then stored in the local cache of the requesting node or returned to the home memory and then sent to the requesting node.

In cache-coherent systems, multiple copies of the same memory block can exist in different nodes. These copies must be read-only and are called "clean" copies in a "shared" state.

When a processor updates its local cache copy, it must ensure that all other copies are invalidated. The processor sends a request to the home memory for the memory block to be owned only by that processor. In response, other processors, which have clean, shared copies of the memory block in their caches, must be sent a memory block recall command.

In current systems, once all processors have responded that the memory block is no longer contained in their caches, the home memory sends a message back to the updating processor that it is now the sole "owner" of the memory block. Consequently, the processor has an "exclusive" and "modified" data copy, which holds the most recent value of the data. The other copies of the memory block are invalid and the copy in the home memory is "stale".

A System Control Unit (SCU) provides the control and the path for data transactions among the following sources and destinations within the node: the processors within the node; the local (node) portion of the memory system; the network connecting all of the nodes of the multi-processor computer system; and the input/output (I/O) system of the local node.

A serious problem in the state-of-art cache-coherent shared-memory multiprocessor system designs is that the memory copy is stale after the crash of the owner node. In other words, the most recent value of a memory block is lost when the cache content is irretrievable at a failed owner node.

In many situations, the software may demand a selective cache-flushing scheme in order to define a synchronization point, at which the most recent value of a memory block is reflected at the home memory by flushing the owner cache.

In today's processor designs, cache flushing is normally implemented as an expensive flushing operation, which may result in wiping out the entire cache rather than the desired cache blocks alone. This flushing of the entire cache of a node is problematic in that it takes considerable computer time to restore a cache. Some systems try to flush a single line of the caches to obtain faster operation, but specific hardware is required and only the operating system can access the hardware so the faster operation is costly. Also although some processors provide selective cache-flushing instructions, there are no guarantees of the correctness unless the cache-flushing instruction has system-wide semantics, which is extremely expensive.

Thus, a system has been long sought and long eluded those skilled in the art, which would provide an efficient implementation of transactional memory and be transparent to the application programs.

DISCLOSURE OF THE INVENTION

The present invention provides a method for cache flushing in a computer system having a processor, a cache, a synchronization primitive detector, and a cache flush engine. The method includes providing a synchronization primitive from the processor into the computer system; detecting the synchronization primitive in the synchronization primitive detector; providing a trigger signal from the synchronization primitive detector in response to detection of the synchronization primitive; providing cache information from the cache flushing engine into the computer system in response to the trigger signal; and flushing the cache in response to the cache information in the computer system. This results in improved fault tolerance and system performance.

The above and additional advantages of the present invention will become apparent to those skilled in the art from a reading of the following detailed description when taken in conjunction with the accompanying drawings.

BRIEF DESCRIPTION OF THE DRAWINGS

FIG. 4 is a single node in accordance with another embodiment of the present invention; and.

BEST MODES FOR CARRYING OUT THE INVENTION

Figure 1:
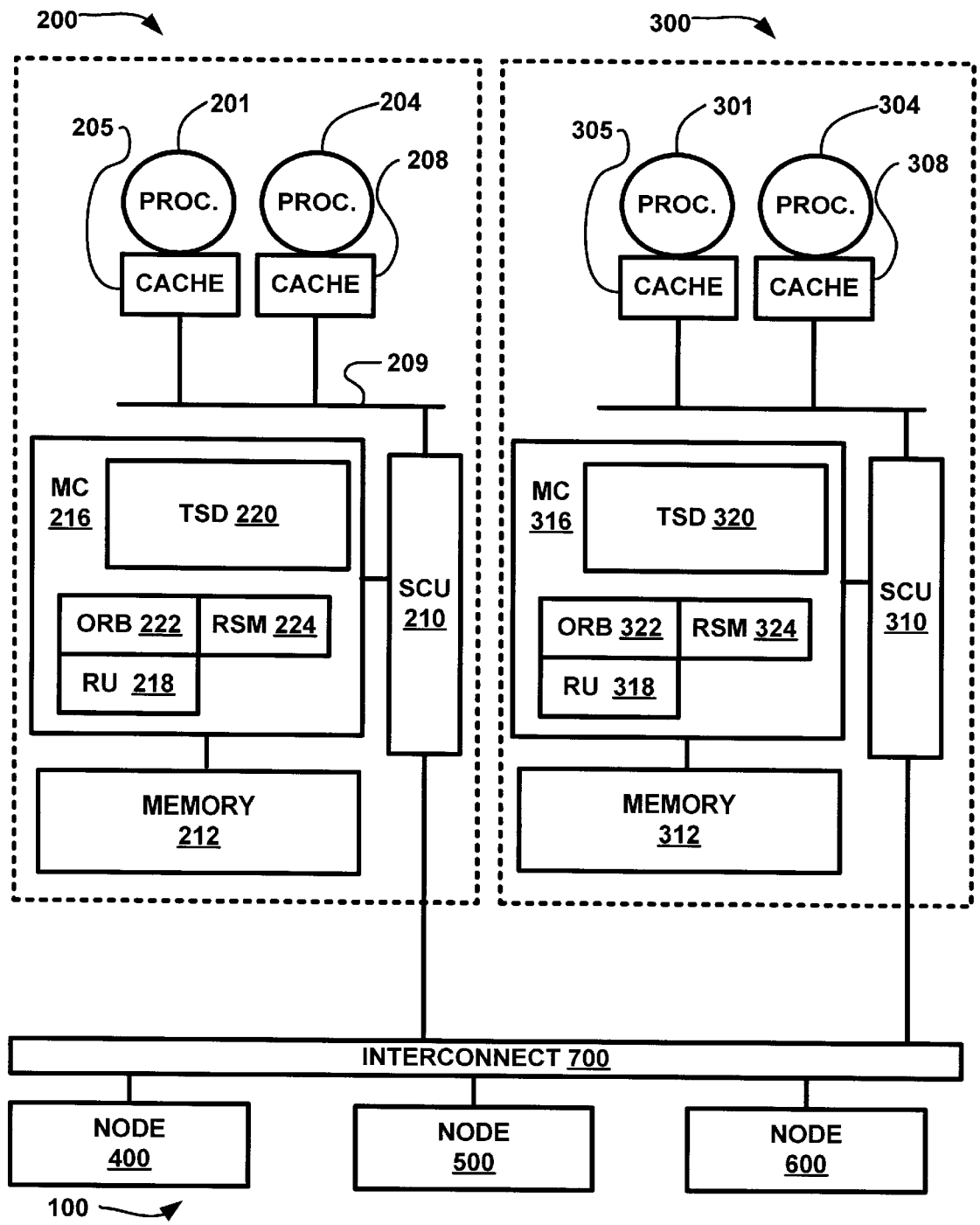
FIG. 1 a cache coherent Distributed Shared Memory (DSM) multiprocessor computer system according to the present invention.
Figure 2:
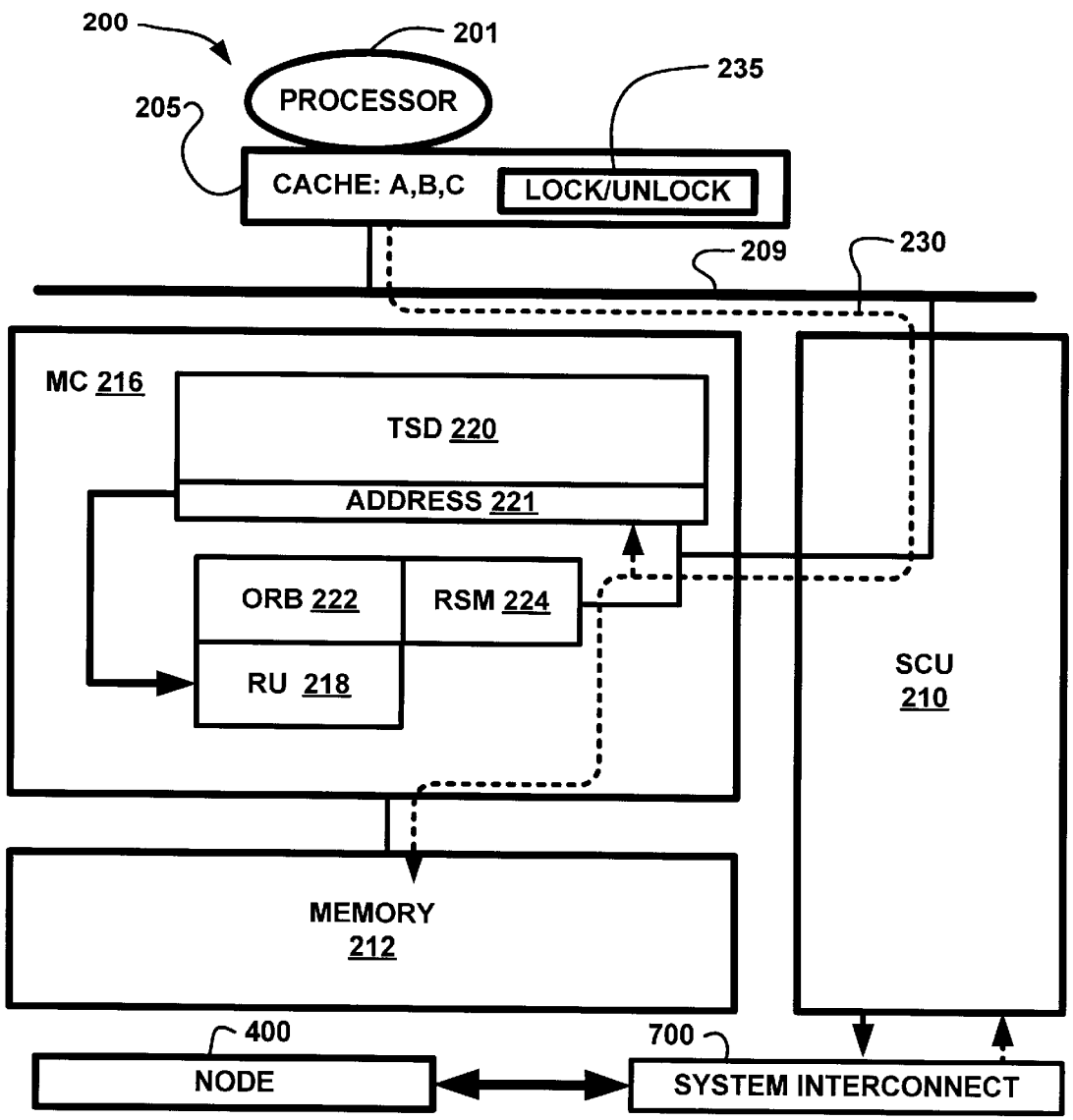
FIG. 2 is a single node in accordance with an embodiment of the present invention.

Referring now to FIG. 1, therein is shown a cache coherent Distributed Shared Memory (ccDSM) multiprocessor computer system 100 of an embodiment of the present invention. It should be understood that the system shown is for illustrative purposes only since the present invention is applicable to all computer architecture designs with caches. The computer system 100 has a plurality of nodes, such as nodes 200, 300, 400, 500 and 600. The nodes 200, etc. are operatively connected to a system interconnect 700, which is part of an interconnection network which includes crossbar switches and links as are well known to those skilled in the art.

Each node contains a plurality of interconnected processors and caches. For example, the node 200 contains processors 201 through 204 (with only the first and last processors shown) and respective caches 205 through 208 (with only the first and last caches shown). The processors 201 through 204 are each capable of providing synchronization primitives or semaphore signals, such as a test and set signal (TSS). The caches 205 through 208 are connected through a data bus 209 to a System Control Unit (SCU) 210.

The SCU 210 is operatively connected to a local node memory 212 through a memory controller (MC) 216. For purposes of the present invention, the SCU 210 is optional, but in systems where it is used, it provides the control and the path for data movement for various sources and destinations within or connected to the node 200. The sources and destinations include: the processors 201 through 204 within the node; the local node memory 212; the system interconnect 700; and the input/output (I/O) system of the local node (not shown). The MC 216 contains a cache-flushing engine such as a recall unit (RU) 218, a test and set detector (TSD) 220, an outstanding recalls buffer (ORB) 222, and a recall state machine (RSM) 224.

The RU 218 is programmed to collect a list of recalls until it receives a trigger command from the TSD 220, which is a synchronization detection mechanism for detecting the synchronization primitives, the TSSs, to begin all of the recalls. Upon completion of the memory recall, the RU 218 either quietly removes the memory block that started the recall or while removing the memory block sends out a completion signal to the original requesting processor that the memory recall has been completed. The completion signal can then be used by the original requesting processor, the operating system, and the other processors to establish that the operation has been completed and the next desired step can be performed. If the recalls are identified as a group within the RU 218, then only one completion signal is required at the completion of all the recalls within the group. The ORB 322 maintains a buffer of outstanding recalls sent from the RU 218. The ORB 322 feeds the addresses to the RSM 224, which puts the addresses on the bus 209 at the maximum data bus rate. The caches throughout the computer system 100 constantly compare addresses on the buses to the addresses of cache lines, which they contain. When a match is made, the cache line corresponding to the matching address is flushed.

The node 300 contains processors 302 through 304 (with only the first and last processors shown) and respective caches 305 through 308 (with only the first and last processors shown). The caches 306 through 308 are operatively connected to a System Control Unit (SCU) 310. The SCU 310 is operatively connected to a local node memory, which for purposes of explanation will be called the home memory 312. The SCU 310 provides the control and the path for data movement for various sources and destinations within the node 300. The MC 316 contains a RU 318, a TSD 320, an ORB 322, and a RSM 324.

The node 300 contains processors 301 through 304 (with only the first and last processors shown) and respective caches 305 through 308 (with only the first and last processors shown). The caches 305 through 308 are operatively connected to a System Control Unit (SCU) 310. The SCU 310 is operatively connected to a local node memory, which for purposes of explanation will be called the home memory 312. The SCU 310 provides the control and the path for data movement for various sources and destinations within the node 300. The MC 316 contains a RU 318, a TSD 320, an ORB 322, and a RSM 324.

The SCU 210 is further connected to the MC 216 and more particularly to the TSD 220 and the RSM 224. The TSD 220 has a TSD address register 221 connected to the RU 218, which is interconnected with the ORB 222 and the RSM 224. The RSM 224 is operatively connected to the node bus 209. The SCU 210 is further operatively connected to the local node memory 212 through the MC 216 and all the units in the MC 216 have access to data between the SCU 210 and the local node memory 212. A path 230 designates the flow of data in one example through the units of interest when a synchronization primitive such as the existing TSS of the computer system 100 is used in the present invention. The synchronization primitive starts a test and set trigger operation, which is an atomic operation which cannot be interrupted while it is occurring.

As data is transmitted down the path 230, it is monitored or "snooped" in the TSD 220, which is a TSS detector. For example, when a TSS is detected, the TSD 220 compares the address on the path 230 with the address in the TSD address register 221 and, if they are equal, a trigger signal IS sent from the TSD 220 to the RU 218. The RU 218 contains all of the addresses of the memory blocks, which should be pulled out of the caches.

When the RU 218 is triggered, all of the addresses are sent to the ORB 222 and the RSM 224 which place the addresses on the bus 209 at the maximum bus rate so all the caches will see the addresses. All the caches, which contain a cache line with one of the particular addresses, will invalidate the cache line having the particular address. If the cache line has been modified, that cache line will generally be flushed to memory. Depending on the system, the cache line having an exclusive state can also have that cache line flushed to memory.

It is understood that cache lines can have three or four states. With four states, the MESI protocol, the states are "modified", "exclusive", "shared", and "invalid". "Modified" means that the cache line has changed or modified data. "Exclusive" means the cache line is the owner and can change the data. "Shared" means the cache line has read-only data although it can share the data with other caches. "Invalid" means the cache line data is no longer correct. With three states, the MSI protocol, the exclusive and modified states are merged so the states are "modified", "shared", and "invalid".

After the ORB 222 has sent all the addresses, it can optionally trigger the RU 218 and cause the RU 218 to generate a completion signal to tell the processor, which initiated the TSS, that the TSS operations have been completed.

In analyzing the problems presented before the present invention, it was determined that it was necessary to find a method of obtaining information from the caches system-wide and obtain it in such a way that the application program running on the multiprocessor system does not change. Therefore, as the application programs runs and performs a normal operation, it should take the appropriate memory lines and flush them back to memory. This resulted in the unexpected realization that a synchronization primitive such as the TSS used for the TSS operations could be used for the lock function in flushing cache lines. Further, it was realized that the completion signal could be used for the unlock function. A lock and unlock are programming structures that protect pieces of code that should not be executed or data that should not be accessed at the same time by two independent processes.

Figure 3:
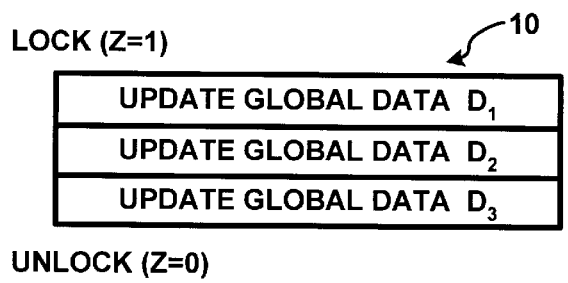
FIG. 3 is an example of a program code fragment using lock and unlock operations.

Referring now to FIG. 3, therein is shown an example of a program code fragment using lock and unlock operations requiring the use of synchronization primitives that use the synchronization mechanism to protect a program code subset 10, which includes variables (data) $D_1$, $D_2$ and $D_3$. If the program code subset 10 has been written correctly, the data $D_1$, $D_2$ and $D_3$ can only be updated after acquiring a lock that is used to protect the data. This is accomplished by setting a synchronization variable, which in this example is a lock variable Z (Z bit) from 0 to 1. After a processor acquires ownership of the lock variable, the first instruction is "update global data $D_1$" so that data $D_1$ is updated globally within the computer system. After the data $D_2$, and $D_3$ is updated globally according to the second and third instructions, namely "update global data $D_2$" and "update global data $D_3$", respectively, the lock is "unlocked". The lock variable Z is then reset from 1 to 0. Thereafter, the lock is free to be acquired by other processors. Thus, only one processor can acquire ownership of the lock at one time, and that processor is then free to perform the operations contained within the code protected by the lock. Once the processor is done and the lock is free, another processor can then acquire the lock to perform its operations. A lock guarantees that only one processor is operating on the regions of code protected by the lock at one time.

Each time a lock is set by a processor, the test and set operation is performed by the processor's cache. If the test and set operation returns with the lock variable set (Z=1) then the test and set succeeded and the processor owns the lock, allowing it to proceed with the operation. If the test and set returns with Z=0, the lock was not acquired and therefore the operation must be postponed. At that point, the program goes on and does something else and tries again later or a "busy waiting" routine is started, which means the program continually checks to see if a lock is acquired until it is acquired. The acquisition of the lock causes cache line flushes to memory that occur in a sequence determined by system delays since not all the processors and caches are at the same distance from the memory that owns the data.

If a lock/unlock pair protect each transaction, after the lock, if there is a system failure, only the one transaction involving the selective cache flushing in process is affected. Either the transaction is lost or nothing has happened to the transaction. By using an unlock, it can be made certain that the current transaction has been completed before the next transaction begins.

An unlock can also be used to perform other advantageous functions. The unlock can also be used as a trigger to start flushing all the cache lines before the next lock is acquired. The cache flush engine uses the time between one unlock and the next lock to perform cache flushes, which increases the speed of the system overall.

In summary, a TSS starts from the processor 201 through the cache 205 to the data bus 209. It will go through the SCU 210 to the memory controller 216 and then into the memory 212. On the way through the memory controller 216, a compare is performed in the TSD 220 on the address in parallel with the TSS. If that address matches the address that is contained in the TSD address register 221, the recall will proceed. This operation in no way impedes the original TSS.

In the TSD address register 221, there are a lock bit and an unlock bit. If the lock bit is set, it performs as described above. The unlock bit is an additional bit. Both lock and unlock can be set because both can be performed. In addition, the lock can be used to recall the data before, and then the unlock can be used to recall the data again to make sure it is saved in the memory 212. Both options are available.

Figure 4:
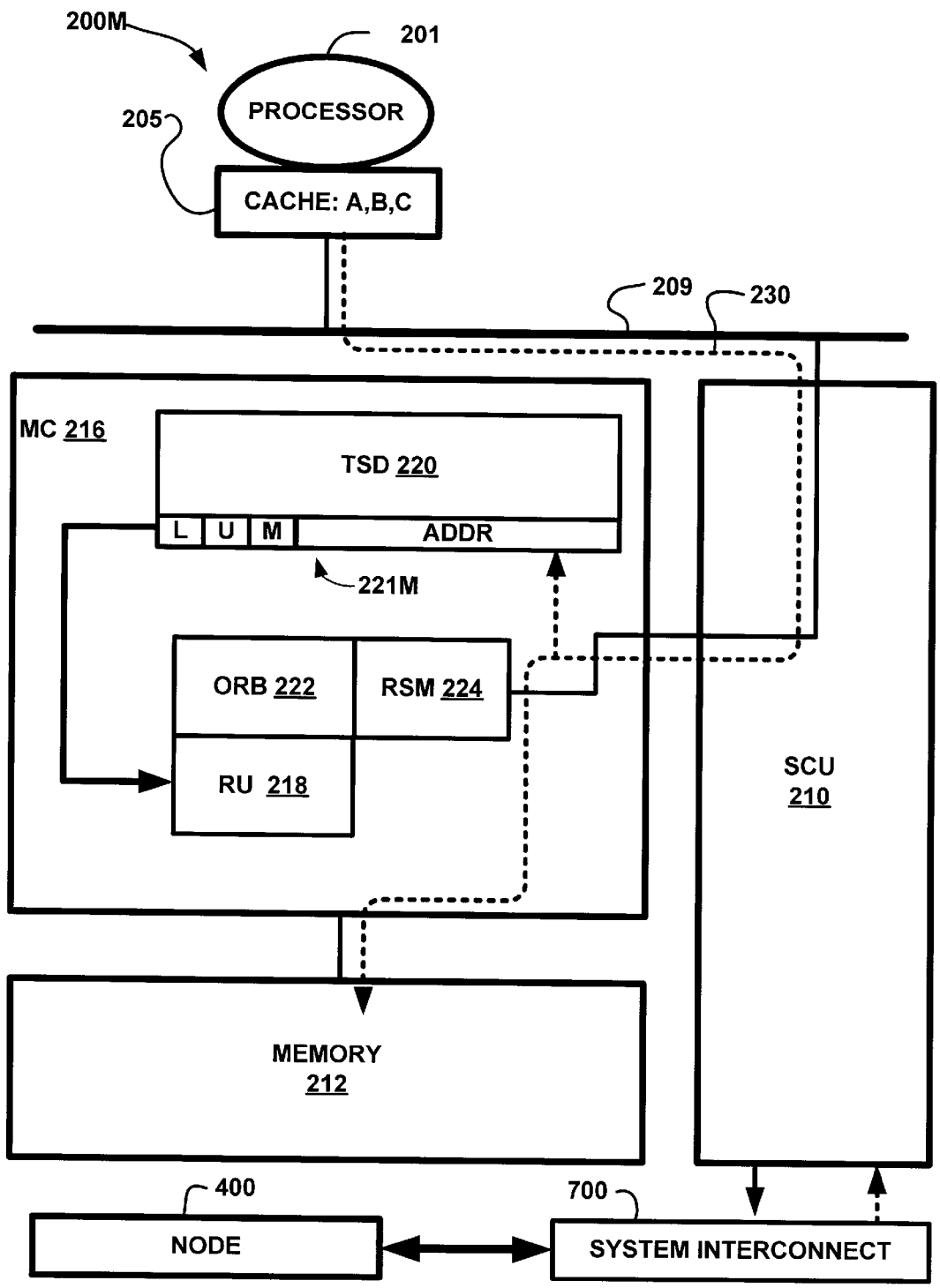

Referring now to FIG. 4, therein is shown a ccDSM multi-processor computer system 200M which is similar to the computer system 200 and uses many of the same numbers except that it has a TSD 220M, which includes a TSD address register 221M with one extra memory bit.

One major problem is that some computer systems, such as the computer system 200M, do not use an unlock so an alternative is necessary.

It has been found that computer systems 200M, which do not use an unlock, do use a "store" or equivalent semantic. The processor 201 sets out loads and stores. A load is getting data from memory 212 and a store is putting data back into memory 212.

In these systems, it has been found that the memory of the trigger happening in the first place must be used for the equivalent of an unlock. After the processor 201 provides the test and set, the lock causes the TSD 220 to compare addresses. If the addresses are equal and the lock bit has not been set but the unlock bit has been set, or if both bits are set, then the memory bit is set. When a store to the address in the TSD 220 is detected, the trigger is sent exactly like an unlock. If the lock and the unlock bits are set, the trigger is given at the time of the lock and at the time of the unlock. At the time of the unlock, the memory bit is cleared and the TSD 220 is reset.

Figure 5:
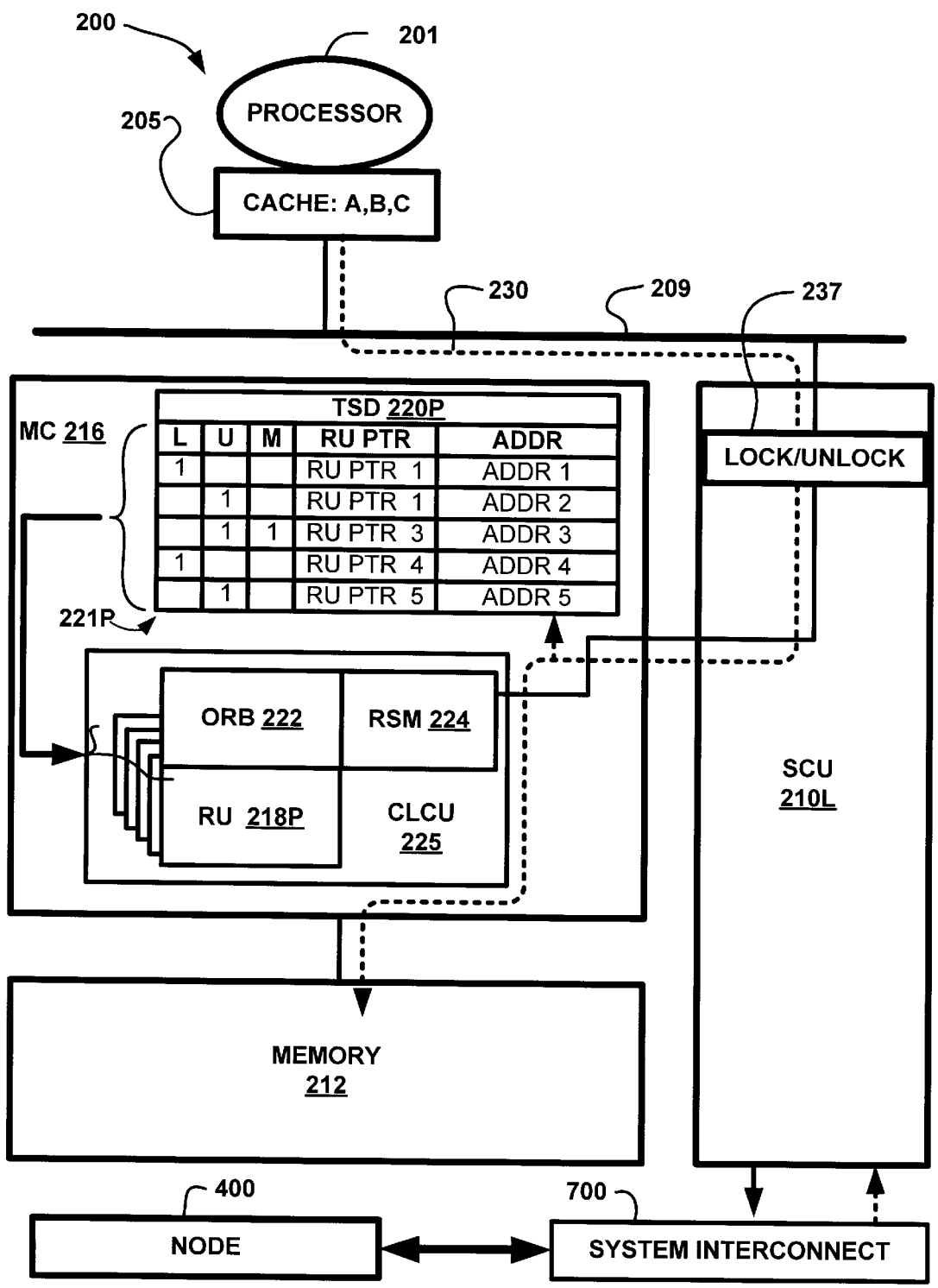
FIG. 5 is a single node in accordance with still another embodiment of the present invention.

Referring now to FIG. 5, therein is shown a ccDSM multi-processor computer system 200P which is similar to the computer system 200 and uses many of the same numbers except that it has a cache line collection unit 225, which includes a plurality of recall units 218P, a TSD 220P, which includes a plurality of TSD address registers 221P, and an SCU 210L, which includes a lock/unlock mechanism 237 providing the lock/unlock functions of FIG. 3. In the computer system 200P, there are multiple recall units and it offers the option of having more than one lock trigger the same series of recalls or other operations and other hardware use different recall units.

The each of plurality of TSD address registers 221P has lock, unlock, memory, and address bits, and additional recall unit pointer bits. The recall unit pointer bit points to the recall unit to be used in a given operation.

When an address comes in, a plurality of comparators (not shown) compare it with the addresses in the TSD 220P in parallel so the arrangement is equivalent to a fully associative lookup. When a corresponding address is found, then the appropriate action is performed for what is set in the lock and unlock bits. If a lock is set, the proper recall unit 218P to send the trigger is determined by the recall pointer. That appropriate recall unit will then send the addresses it contains to the ORB 222. Through the use of the RSM 224, all the appropriate caches are flushed. If the unlock bit is set, then the memory bit is set to indicate that the lock has already occurred and to wait until the store happens for the unlock function. As previously explained, this is only necessary if there is no separate command for unlock. If there is a separate command, such as an unlock, the memory bit is not required and the system waits for the separate command.

The lock/unlock mechanism can be stored anywhere in a computer system, such as in the cache, memory controllers, or other subsystem in the computer system.

The present invention discloses a method of detecting synchronization primitives to trigger cache flushes. The example used to illustrate this uses the synchronization primitive of a lock/unlock signal as a trigger to activate cache-flushing operations of one or more memory blocks. The trigger can be set to go off upon lock acquisition, release, or both. The actual cache-flushing mechanism can be software or hardware as described in the Fong Pong application above, incorporated by reference herein, and attached directly to the lock/unlock mechanism. A programmer can selectively flush cache lines by preprogramming the specific lines to be flushed and using the acquisition, release, or both of a lock for providing a trigger signal.

The lock/unlock mechanism can be implemented in hardware or software in the form of a macro program with multiple instructions around it. The lock/unlock function can be incorporated in a macro program. Since the macro program is almost always outside the main program, it allows a programmer to insert the unlock/lock function in the main program with minimal change to the main program. Therefore, the cache-flushing system according to the present invention is easy to implement and results in a more economical and robust system. In addition, if the same set of cache lines is used multiple times, they do not have to be rewritten to the hardware as the lock/unlock mechanism has the same cache lines associated with it until they are changed by the programmer.

It should be noted that a list of specific flushes can be made to attach to a specific lock/unlock mechanism in accordance with the present invention so that the addresses to be "flushed" are written in the software only once and then reused throughout the life of the application whenever the lock is used.

In one embodiment for the unlock operation, the lock is held until the cache flushing is completed. However, the process is allowed to continue execution in parallel with the flushing operation as long as the process does not try to acquire the lock that has not yet been released. This increases system performance.

In another embodiment for a lock operation, the flushing of the cache lines is done in parallel with the code protected by the locks and any overlap is handled by the cache coherence system.

In some of the above embodiments, the lock cannot be reacquired before the flushed cache lines have been returned to memory.

In still another embodiment, the unlock operation is not performed until all cache flushing is completed. This makes it easier to perform roll-back when an error or hardware failure occurs.

Another advantage of the present invention is that shared cache lines and cache lines in a dirty or exclusive state can be flushed. This technique can be used to retrieve cache lines before a series of writes are performed. As a result, system performance can be increased by causing other processors to relinquish the cache line before the locking processor needs it, similar to a "prefetch" operation to cause idle memory state. Moreover, if the cache-flushing engine is located within a recall unit, it may be used to retrieve cache lines before a series of writes are performed, such as attaching and executing the recall command when acquiring a lock.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A method for cache flushing in a computer system, comprising:

providing a processor, a cache, a synchronization primitive detector, and a cache flush engine operatively connected together;

providing a synchronization primitive from the processor into the computer system;

detecting the synchronization primitive in the synchronization primitive detector;

providing a trigger signal from the synchronization primitive detector in response to detection of the synchronization primitive;

providing cache information from the cache flush engine into the computer system in response to the trigger signal;

flushing the cache in response to the cache information in the computer system;

a second processor capable of providing a synchronization primitive into the computer system;

a synchronization mechanism having a synchronization variable; detecting synchronization primitives in the synchronization mechanism; and providing ownership of the synchronization variable to the processor or the second processor providing the first synchronization primitive detected in the synchronization mechanism.

2. The method as claimed in claim 1 including: providing a completion signal from the cache flush engine after flushing is completed; and allowing the processor or the second processor to acquire ownership of the synchronization variable after the completion signal is provided.

3. The method as claimed in claim 1, wherein: providing a trigger signal includes remembering the trigger signal has been provided;

providing a second synchronization primitive from the processor into the computer system; and allowing the processor or the second processor to acquire ownership of the synchronization variable after the processor provides the second synchronization primitive and the trigger signal is remembered as having been provided.

4. The method as claimed in claim 1 wherein providing the trigger signal includes providing the trigger signal in response to a group consisting of acquisition of the synchronization variable, release of the synchronization variable, and a combination thereof.

5. The method as claimed in claim 1 wherein flushing the cache is completed before allowing the processor or the second processor to acquire ownership of the synchronization variable.

6. A method for cache flushing in a computer system, comprising:
providing a plurality of processors, a plurality of caches, a synchronization primitive detector, and a cache flush engine operatively connected together;
providing a synchronization primitive and a synchronization primitive address from one of the plurality of processors into the computer system;
detecting the synchronization primitive in the synchronization primitive detector;
comparing a synchronization primitive detector address in the synchronization primitive detector with the synchronization primitive address after detecting the synchronization primitive;
providing a trigger signal from the synchronization primitive detector in response to detection of the synchronization primitive and the same synchronization primitive detector address and the synchronization primitive address;
providing a flush cache line address from the cache flush engine into the computer system in response to the trigger signal;
flushing cache lines in the plurality of caches having a cache line address corresponding to the flush cache line address in response to the flush cache line address in the computer system;
providing a synchronization mechanism having a synchronization variable;
detecting a synchronization primitive in the synchronization mechanism;
providing ownership of the synchronization variable to the one of the plurality of processors providing the first synchronization primitive detected in the synchronization mechanism; and
preventing the others of the plurality of processors from acquiring the synchronization variable.

7. The method as claimed in claim 6 including: providing a completion signal from the cache flush engine after flushing is completed; and allowing at least one of the plurality of processors to acquire ownership of the synchronization variable after the completion signal is provided.

8. The method as claimed in claim 6 including:
providing a trigger signal includes remembering the trigger signal has been provided;
providing a second synchronization primitive from the one of the plurality of processors into the computer system; and
allowing at least one of the plurality of processors to acquire ownership of the synchronization variable after the one of the plurality of processors provides a second synchronization primitive and the trigger signal is remembered as having been provided.

9. The method as claimed in claim 6 wherein providing the trigger signal includes providing the trigger signal in response to a group consisting of acquisition of the synchronization variable, release of the synchronization variable, and a combination thereof.

10. The method as claimed in claim 6 wherein flushing the cache lines is completed by the one of the plurality of processors before allowing another of the plurality of processors to acquire ownership of the synchronization variable.

11. A method for cache flushing in a computer system, comprising:
providing a plurality of processors, a plurality of caches, a test and set detector, and a recall unit operatively connected together;
providing a test and set signal and a test and set address from one of the plurality of processors into the computer system;
detecting the test and set signal in the test and set detector;
comparing a test and set detector address in the test and set detector with the test and set address after detecting the test and set signal;
providing a trigger signal from the test and set detector in response to detection of the test and set signal and the same test and set detector address and the test and set trigger address;
providing a flush cache line address from the recall unit into the computer system in response to the trigger signal;
flushing a cache line in the plurality of caches having a cache line address corresponding to the flush cache line address in response to the flush cache line address in the computer system;
providing a lock/unlock mechanism having a lock variable;
detecting the test and set signal in the lock/unlock mechanism;
providing ownership of the lock variable to the one of the plurality of processors;
providing a test and set signal detected in the lock/unlock mechanism; and
preventing the others of the plurality of processors from acquiring the lock variable.

12. The method as claimed in claim 11 including: providing a completion signal from the recall unit after flushing is completed; and allowing at least one of the plurality of processors to acquire ownership of the lock variable after the completion signal is provided.

13. The method as claimed in claim 11 wherein:
providing a trigger signal includes activating a memory mechanism to remember the trigger signal has been provided;
providing a store signal from the one of the plurality of processors into the computer system; and
allowing at least one of the plurality of processors to acquire ownership of the lock variable after the one of the plurality of processors provides the store signal and the trigger signal is remembered as having been provided.

14. The method as claimed in claim 11 wherein providing the trigger signal includes providing the trigger signal in response to a group consisting of acquisition of the lock variable, release of the lock variable, and a combination thereof.

15. The method as claimed in claim 11 wherein flushing the cache is completed before allowing another of the plurality of processors to acquire ownership of the lock variable.

* * * * *